United States Patent [19]

Dang et al.

[11] Patent Number: 5,312,876
[45] Date of Patent: May 17, 1994

[54] WATER SOLUBLE RIGID-ROD POLYMER

[75] Inventors: Thuy D. Dang, Dayton; Fred E. Arnold, Centerville, both of Ohio

[73] Assignee: The United States of America as represented by the Secretary of the Air Force, Washington, D.C.

[21] Appl. No.: 30,523

[22] Filed: Mar. 12, 1993

[51] Int. Cl.$^5$ .............................................. C08G 73/18
[52] U.S. Cl. .................................. 525/435; 525/420; 525/434; 528/172; 528/337; 528/342
[58] Field of Search ............ 525/435, 420, 434; 528/172, 337, 342

[56] References Cited

U.S. PATENT DOCUMENTS

| | | | |
|---|---|---|---|
| 4,785,115 | 11/1988 | Tsai et al. | 548/180 |
| 4,814,399 | 3/1989 | Sansone et al. | 525/435 |
| 4,997,892 | 3/1991 | Sansone et al. | 525/435 |
| 5,081,256 | 1/1992 | Arnold et al. | 548/159 |
| 5,140,092 | 8/1992 | Arnold et al. | 528/183 |
| 5,175,232 | 12/1992 | Arnold et al. | 528/168 |

OTHER PUBLICATIONS

Thuy D. Dang & Fred E. Arnold, Water Soluble Rigid-Rod Polymers, *Polymer Preprints* 33(1), Apr. 1992.

*Primary Examiner*—Harold D. Anderson
*Attorney, Agent, or Firm*—Charles E. Bricker; Thomas L. Kundert

[57] ABSTRACT

Water-soluble rigid-rod aromatic heterocyclic polymers having repeating units of the formula:

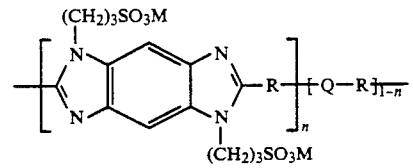

wherein n has a value of 0.05 to 1.00, M is an alkali metal, Q is a benzobisazole of the formula

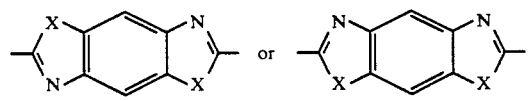

wherein X is —S— or —O—, and R is selected from the group consisting of:

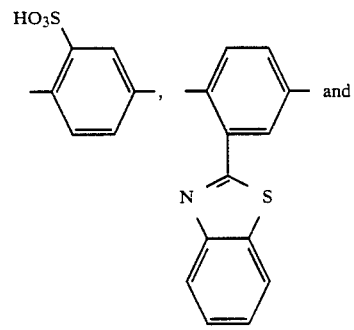

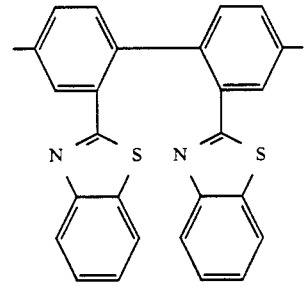

6 Claims, No Drawings

WATER SOLUBLE RIGID-ROD POLYMER

RIGHTS OF THE GOVERNMENT

The invention described herein may be manufactured and used by or for the Government of the United States for all governmental purposes without the payment of any royalty.

BACKGROUND OF THE INVENTION

This invention relates to para-ordered aromatic heterocyclic polymers which are soluble in water.

In general, the class of aromatic heterocyclic extended chain polymers and copolymers is well known for their outstanding thermal, physical and chemical properties. These polymers and copolymers generally exhibit excellent modulus and tenacity properties. Although these materials exhibit superior mechanical properties, they have the drawback that they generally can only be fabricated from strong corrosive acids such as polyphosphoric acid or methanesulfonic acid.

Considerably research effort has been directed to structural modifications of these aromatic heterocyclic extended chain polymers and copolymers to promote solubility in solvents other than strong acids. For example, 2-benzthiazole groups attached to a poly(p-phenylene benzobisimidazole) promote solubility in dimethylsulfoxide (DMSO). It would be advantageous if the aromatic heterocyclic extended chain polymers and copolymers were water soluble.

Accordingly, it is an object of this invention to provide para-ordered aromatic heterocyclic polymers and copolymers which are soluble in water.

Other objects and advantages of the invention will be apparent to those skilled in the art.

SUMMARY OF THE INVENTION

In accordance with the present invention, there are provided water-soluble polymers having repeating units of the formula:

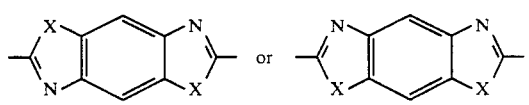

wherein n has a value of 0.05 to 1.00, M is an alkali metal such as Na, Q is a benzobisazole of the formula

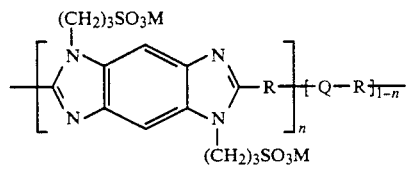

wherein X is —S— or —O—, and R is selected from the group consisting of:

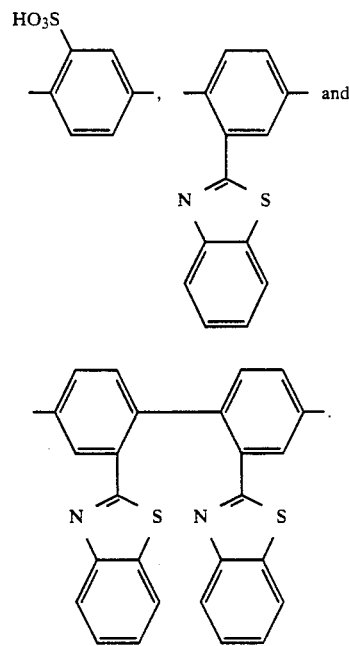

Also provided is a method for preparing the water-soluble polymers above, which comprises treating the corresponding sulfo- or benzthiazo-pendant polymer or copolymer with a hydride to form the polyanion followed by treatment of the polyanion with 2-propanesultone and thereafter isolating the propane sulfonate polymer or copolymer.

DETAILED DESCRIPTION OF THE INVENTION

The polymers and copolymers which can be employed in the method of this invention to prepare the corresponding water-soluble polymers and copolymers must exhibit partial solubility in an aprotic solvent, such as dimethylsulfoxide (DMSO). Polymers and copolymers derived from 2-benzthiazole terephthalic acid, 4,4'-dicarboxy-2,2'-bisbenzthiazolyl biphenyl and 2-sulfoterephthalic acid exhibit solubility in DMSO and can be used for derivatization to the propane sulfonates.

The polymer and copolymer compositions employed in the method this invention are prepared by the polycondensation of 2-benzthiazole terephthalic acid, 4,4'-dicarboxy-2,2'-bisbenzthiazolyl biphenyl or 2-sulfoterephthalic acid with 1,2,4,5-tetraaminobenzene hydrochloride and, optionally, 2,5-diamino-1,4-benzenedithiol dihydrochloride, 4,6-diamino-1,3-benzenedithiol dihydrochloride, 4,6-diaminoresorcinol dihydrochloride, 2,5-diaminohydroquinone dihydrochloride.

4,4'-dicarboxy-2,2'-bisbenzthiazolyl biphenyl can be prepared by condensation of 4,4'-dibromodiphenic acid with o-aminothiophenol in PPA followed by nucleophilic displacement of the dibromo groups with cuprous cyanide in n-methyl-2-pyrrolidinone followed by acid hydrolysis of the dinitriles.

2-sulfoterephthalic acid can be prepared by the sulfonation of terephthalic acid with 100% sulfuric acid with mercury as a catalyst or by the oxidation of 2-sulfo-p-xylene with basic permanganate followed by acid treatment.

The polycondensation is carried out in polyphosphoric acid (PPA). In carrying out the process, stiochiometric amounts of the monomers are first heated at about 40°–80° C. in 77 percent PPA to effect dehydrochlorination of the amino hydrochloride monomer(s). This step is carried out under reduced nitrogen pressure to facilitate removal of the hydrogen chloride. After complete dehydrochlorination, the temperature is lowered to about 50° C. and $P_2O_6$ is added to provide about 82–84% PPA. The reaction mixture is then slowly heated under a nitrogen atmosphere to about 190° C., at atmospheric pressure. In general, the concentration of monomers in the acid ranges from about 0.5 to 15.0 weight percent. It is presently preferred to employ monomer concentrations above about 10 weight percent, in order to provide anisotropic reaction mixtures.

Alternatively, the amino hydrochloride monomer(s) may be mixed with PPA, then heated, under vacuum or an inert gas atmosphere to about 40°–80° C. over a period of 3 to 24 hours to dehydrochlorinate the amino hydrochloride monomer(s). At the end of this period, the dicarboxylic acid is added. An additional quantity of $P_2O_5$ and/or PPA may be added as required to provide a stirrable mixture and to increase the concentration of PPA to about 82–84%.

It is preferred to carry out the polymerization in stages, i.e., a step-wise heating schedule is employed. Such a schedule is preferred because immediately exposing the reaction mixture to relatively high polymerization temperature may cause decomposition of one or more monomers. The selection of a particular step-wise heating schedule is obvious to one of ordinary skill in the art. An exemplary heating schedule is 60° C. for 4 hours, 100° C. for 2 hours, 160° C. for 24 hours and 190° C. for 4 hours.

At the end of the reaction period, the polymer solution is in a very viscous or semi-solid state. After cooling, the product can be recovered by coagulation in water.

The substituted polymers and copolymers are first treated with a hydride, such as sodium hydride, in anhydrous aprotic solvent, such as DMSO, to form the polyanion. After complete dissolution of the polyanion, excess 2-propanesultone is added and the mixture heated to about 40°–60° C. Following a suitable reaction period, the resulting propane sulfonate is recovered by precipitation in acetone or THF or the like.

The molecular weight of these polymers is commonly indicated by the inherent viscosity of the polymer. The inherent viscosity is commonly determined at a concentration of 0.2 weight percent in methanesulfonic acid (MSA) at 30° C. The inherent viscosity of the propane sulfonate polymers and copolymers is determined in 50% aqueous DMSO containing 1% LiCl. The LiCl is added to prevent polyelectrolyte effects on obtaining solution viscosities.

The polymers and copolymers prepared in accordance with the invention can be processed into fibers and sheets from aqueous solution. The propane sulfonate polymers and copolymers can be converted to the corresponding sulfonic acids by treatment with an acid, such as concentrated HCl.

The following examples illustrate the invention.

EXAMPLE I

Derivatization of
Poly(1,7-dihydrobenzo(1,2-d:4,5-d')diimidazo-2,6-diyl(2-(2-sulfo)-p-phenylene))

100 g of anhydrous DMSO and 0.44 g of sodium hydride (60% w/w in mineral oil) (0.264 g, 0.011 mol) were placed in a 250 ml round bottom flask equipped with a mechanical stirrer, thermometer and nitrogen inlet/outlet. The suspension was stirred at room temperature under nitrogen for 30 min followed by heating at 75° C. for 1 hour. The resulting clear, light-green solution was cooled to 40° C. and 1.0 g (0.003 mol) of 2-sulfo poly(p-phenylenebenzobisimidazole) ($[\eta]=14.0$ dl/g, MSA, 30° C.) was added. After being stirred for 24 hours at 60° C., the resulting suspension became homogeneous and was converted to a red solution. The solution was cooled to room temperature and 0.85 g (0.007 mol) of 1,3-propanesultone was added. The mixture was stirred at 40° C. for 24 hours, during which time the mixture color changed to yellow. The mixture was heated at 60° C. for 2 more hours to insure complete reaction. The mixture was cooled, then poured into 500 ml of acetone and stirred until the polymer was broken into small pieces. The polymer was filtered and extracted in a soxhlet extraction apparatus with acetone to remove excess 1,3-propanesultone. The polymer was freeze-dried from a benzene slurry, then dried under reduced pressure (0.05 mm) at 100° C. The polymer exhibited an intrinsic viscosity of 6:8 dl/g in DMSO/water/LiCl at 30° C.

EXAMPLE II

Derivatization of Copoly(10%)
(1,7-dihydrobenzo(1,2-d:4,5-d')diimidazo-2,6-diyl
(90%)
(benzo(1,2-d:4,5-d')bisthiazole-2,6-diyl(2-(2-sulfo)-p-phenylene))

100 g of anhydrous DMSO and 0.44 g of sodium hydride (60% w/w in mineral oil) (0.264 g, 0.011 mol) were placed in a 250 ml round bottom flask equipped with a mechanical stirrer, thermometer and nitrogen inlet/outlet. The suspension was stirred at room temperature under nitrogen for 30 min followed by heating at 75° C. for 1 hour. The resulting clear, light-green solution was cooled to 40° C. and 1.0 g (0.003 mol) of the above 10:90 copolymer ($[\eta]=12.0$ dl/g, MSA, 30° C.) was added. After being stirred for 24 hours at 60° C., the resulting suspension became homogeneous and was converted to a red solution. The solution was cooled to room temperature and 0.85 g (0.007 mol) of 1,3-propanesultone was added. The mixture was stirred at 40° C. for 24 hours, during which time the mixture color changed to yellow. The mixture was heated at 60° C. for 2 more hours to insure complete reaction. The mixture was cooled, then poured into 500 ml of acetone and stirred until the polymer was broken into small pieces. The polymer was filtered and extracted in a soxhlet extraction apparatus with acetone to remove excess 1,3-propanesultone. The polymer was freeze-dried from a benzene slurry, then dried under reduced pressure (0.05 mm) at 100° C. The polymer exhibited an intrinsic viscosity of 6.1 dl/g in DMSO/water/LiCl at 30° C.

EXAMPLE III

Derivatization of
Copoly(25%)(1,7-dihydrobenzo(1,2-d:4,5-d')diimidazo-2,6-diyl(75%)(benzo(1,2-d:4,5-d')bisthiazole-2,6-diyl(2-(2-sulfo)-p-phenylene))

100 g of anhydrous DMSO and 0.44 g of sodium hydride (60% w/w in mineral oil) (0.264 g, 0.011 mol) were placed in a 250 ml round bottom flask equipped with a mechanical stirrer, thermometer and nitrogen inlet/outlet. The suspension was stirred at room temperature nder nitrogen for 30 min followed by heating at 75° C. for 1 hour. The resulting clear, light-green solution was cooled to 40° C. and 1.0 g (0.003 mol) of the above 25:75 copolymer ($[\eta]=12.0$ dl/g, MSA, 30° C.) was added. After being stirred for 24 hours at 60° C., the resulting suspension became homogeneous and was converted to a red solution. The solution was cooled to room temperature and 0.85 g (0.007 mol) of 1,3-propanesultone was added. The mixture was stirred at 40° C. for 24 hours, during which time the mixture color changed to yellow. The mixture was heated at 60° C. for 2 more hours to insure complete reaction. The mixture was cooled, then poured into 500 ml of acetone and stirred until the polymer was broken into small pieces. The polymer was filtered and extracted in a soxhlet extraction apparatus with acetone to remove excess 1,3-propanesultone. The polymer was freeze-dried from a benzene slurry, then dried under reduced pressure (0.05 mm) at 100° C. The polymer exhibited an intrinsic viscosity of 6.1 dl/g in DMSO/water/LiCl at 30° C.

EXAMPLE IV

Derivatization of Copoly(50%)(1,7-dihydrobenzo(1,2-d:4,5-d')diimidazo-2,6-diyl(50%)(benzo(1,2-d:4,5-d')bisthiazole-2,6-diyl(2-(2-sulfo)-p-phenylene))

100 g of anhydrous DMSO and 0.44 g of sodium hydride (60% w/w in mineral oil)(0.264 g, 0.011 mol) were placed in a 250 ml round bottom flask equipped with a mechanical stirrer, thermometer and nitrogen inlet/outlet. The suspension was stirred at room temperature under nitrogen for 30 min followed by heating at 75° C. for 1 hour. The resulting clear, light-green solution was cooled to 40° C. and 1.0 g (0.003 mol) of the above 50:50 copolymer ($[\eta]=6.0$ dl/g, MSA, 30° C.) was added. After being stirred for 24 hours at 60° C., the resulting suspension became homogeneous and was converted to a red solution. The solution was cooled to room temperature and 0.85 g (0.007 mol) of 1,3-propanesultone was added. The mixture was stirred at 40° C. for 24 hours, during which time the mixture color changed to yellow. The mixture was heated at 60° C. for 2 more hours to insure complete reaction. The mixture was cooled, then poured into 500 ml of acetone and stirred until the polymer was broken into small pieces. The polymer was filtered and extracted in a soxhlet extraction apparatus with acetone to remove excess 1,3-propanesultone. The polymer was freeze-dried from a benzene slurry, then dried under reduced pressure (0.05 mm) at 100° C. The polymer exhibited an intrinsic viscosity of 3.2 dl/g in DMSO/water/LiCl at 30° C.

EXAMPLE V

Derivatization of Copoly(75%)(1,7-dihydrobenzo(1,2-d:4,5-d')diimidazo-2,6-diyl (25%)(benzo(1,2-d:4,5-d')bisthiazole-2,6-diyl(2-(2-sulfo)-p-phenylene))

100 g of anhydrous DMSO and 0.44 g of sodium hydride (60% w/w in mineral oil)(0.264 g, 0.011 mol) were placed in a 250 ml round bottom flask equipped with a mechanical stirrer, thermometer and nitrogen inlet/outlet. The suspension was stirred at room temperature under nitrogen for 30 min followed by heating at 75° C. for 1 hour. The resulting clear, light-green solution was cooled to 40° C. and 1.0 g (0.003 mol) of the above 75:25 copolymer ($[\eta]=8.5$ dl/g, MSA, 30° C.) was added. After being stirred for 24 hours at 60° C., the resulting suspension became homogeneous and was converted to a red solution. The solution was cooled to room temperature and 0.85 g (0.007 mol) of 1,3-propanesultone was added. The mixture was stirred at 40° C. for 24 hours, during which time the mixture color changed to yellow. The mixture was heated at 60° C. for 2 more hours to insure complete reaction. The mixture was cooled, then poured into 500 ml of acetone and stirred until the polymer was broken into small pieces. The polymer was filtered and extracted in a soxhlet extraction apparatus with acetone to remove excess 1,3-propanesultone. The polymer was freeze-dried from a benzene slurry, then dried under reduced pressure (0.05 mm) at 100° C. The polymer exhibited an intrinsic viscosity of 4.2 dl/g in DMSO/water/LiCl at 30° C.

EXAMPLE VI

Solubility Properties of Derivatized Systems

A series of polymers prepared from 2-benzthiazole terephthalic acid (polymer 1, below), 4,4'-dicarboxy-2,2'-bisbenzthiazolyl biphenyl (polymer 3, below) and 2-sulfoterephthalic acid (polymers 6 and 7, below), then derivatized as described in the previous Examples. The intrinsic viscosity and water solubility of each of the derivatized sodium sulfonate polymers are given in Table I, below. The sulfonate polymers were converted to the corresponding sulfonic acids by treatment with concentrated HCl. The intrinsic viscosity and water solubility of each of the sulfonic acid polymers are given in Table I, below.

TABLE I

| Polymer | $[\eta]^a$ Sulfonate | Solubility | $[\eta]^b$ Sulfonic Acid | Solubility |
|---|---|---|---|---|
| 1 | 3.3 | Soluble | 2.6 | Insoluble |
| 3 | 5.0 | Soluble | 4.4 | Insoluble |
| 6 | 4.5 | Soluble | 6.3 | Soluble |
| 7 | 6.8 | Soluble | 8.5 | Soluble |

Note
[a] Intrinsic viscosity in 50% Aqueous DMSO/1% LiCl
[b] Intrinsic viscosity in MSA Various modifications may be made to the invention as described without departing from the spirit of the invention or the scope of the appended claims.

We claim:

1. A water-soluble rigid-rod aromatic heterocyclic polymer having repeating units of the formula:

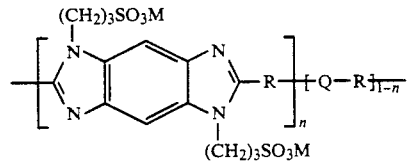

wherein n has a value of 0.05 to 1.00, M is an alkali metal, Q is a benzobisazole of the formula

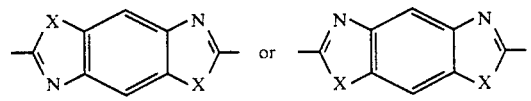

wherein X is —S— or —O—, and R is

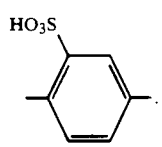
2. The polymer of claim 1 wherein n is 1.0.
3. The polymer of claim 1 wherein n is 0.1.
4. The polymer of claim 1 wherein n is 0.25.
5. The polymer of claim 1 wherein n is 0.5.
6. The polymer of claim 1 wherein n is 0.75.
* * * * *
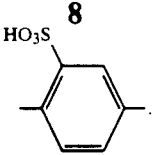
2. The polymer of claim 1 wherein n is 1.0.
3. The polymer of claim 1 wherein n is 0.1.
4. The polymer of claim 1 wherein n is 0.25.
5. The polymer of claim 1 wherein n is 0.5.
6. The polymer of claim 1 wherein n is 0.75.
* * * * *